United States Patent
Edwards et al.

(10) Patent No.: US 8,516,478 B1
(45) Date of Patent: Aug. 20, 2013

(54) SUBSEQUENT PROCESSING OF SCANNING TASK UTILIZING SUBSET OF VIRTUAL MACHINES PREDETERMINED TO HAVE SCANNER PROCESS AND ADJUSTING AMOUNT OF SUBSEQUEST VMS PROCESSING BASED ON LOAD

(75) Inventors: Jonathan L. Edwards, Portland, OR (US); John D. Teddy, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 957 days.

(21) Appl. No.: 12/138,104

(22) Filed: Jun. 12, 2008

(51) Int. Cl.
*G06F 9/445* (2006.01)
*G06F 9/46* (2006.01)
*G06F 15/16* (2006.01)

(52) U.S. Cl.
USPC ............................... 718/1; 718/106; 709/201

(58) Field of Classification Search
USPC ..................... 718/1, 106; 709/201
See application file for complete search history.

(56) References Cited

U.S. PATENT DOCUMENTS

| 7,096,501 | B2* | 8/2006 | Kouznetsov et al. | 726/24 |
|---|---|---|---|---|
| 7,266,823 | B2* | 9/2007 | Alford, Jr. | 718/104 |
| 7,409,522 | B1* | 8/2008 | Fair et al. | 711/170 |
| 8,176,497 | B2* | 5/2012 | Yang et al. | 718/108 |
| 2003/0200333 | A1* | 10/2003 | Espieu et al. | 709/240 |
| 2005/0132362 | A1* | 6/2005 | Knauerhase et al. | 718/1 |
| 2006/0136720 | A1* | 6/2006 | Armstrong et al. | 713/164 |
| 2007/0214456 | A1* | 9/2007 | Casey et al. | 718/100 |
| 2007/0234364 | A1* | 10/2007 | Lipton et al. | 718/102 |
| 2008/0104608 | A1* | 5/2008 | Hyser et al. | 718/105 |
| 2008/0235324 | A1* | 9/2008 | Abernethy et al. | 709/201 |
| 2009/0089879 | A1* | 4/2009 | Wang et al. | 726/24 |

* cited by examiner

*Primary Examiner* — Meng An
*Assistant Examiner* — Blake Kumabe
(74) *Attorney, Agent, or Firm* — Wong, Cabello, Lutsch, Rutherford & Brucculeri, LLP

(57) ABSTRACT

A system, method, and computer program product are provided for processing a task utilizing a virtual machine as a function of an aspect of another virtual machine. In use, a task to be processed is identified. Furthermore, the task is processed utilizing at least one virtual machine located in a device as a function of at least one aspect of at least one other virtual machine located on the device.

16 Claims, 7 Drawing Sheets

SUBSEQUENT PROCESSING OF SCANNING TASK UTILIZING SUBSET OF VIRTUAL MACHINES PREDETERMINED TO HAVE SCANNER PROCESS AND ADJUSTING AMOUNT OF SUBSEQUEST VMS PROCESSING BASED ON LOAD

FIELD OF THE INVENTION

The present invention relates to processing tasks, and more particularly to processing tasks utilizing virtual machines.

BACKGROUND

Traditionally, virtual machines have been utilized for processing data within a protected virtual environment. For example, virtual machines may be utilized for scanning data for unwanted data (e.g. malware), such that unwanted activity resulting from the scanning of unwanted data is contained within the virtual machines. However, traditional techniques for processing tasks utilizing virtual machines have exhibited various limitations. Just by way of example, multiple virtual machines employed by a single device have conventionally operated independently, thus resulting in significant resource consumption associated with the device when scanning is simultaneously performed by such virtual machines.

There is thus a need for addressing these and/or other issues associated with the prior art.

SUMMARY

A system, method, and computer program product are provided for processing a task utilizing a virtual machine as a function of an aspect of another virtual machine. In use, a task to be processed is identified. Furthermore, the task is processed utilizing at least one virtual machine located in a device as a function of at least one aspect of at least one other virtual machine located on the device.

DETAILED DESCRIPTION

Figure 1:
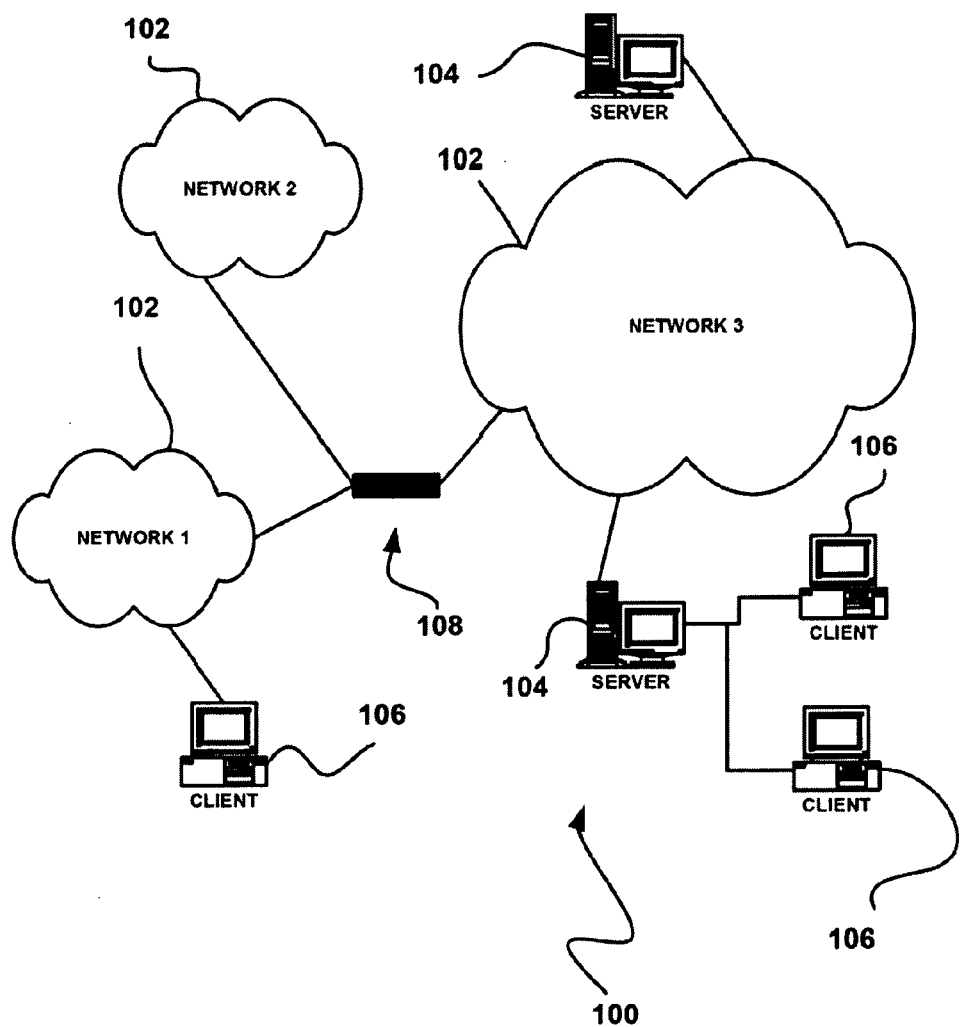
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
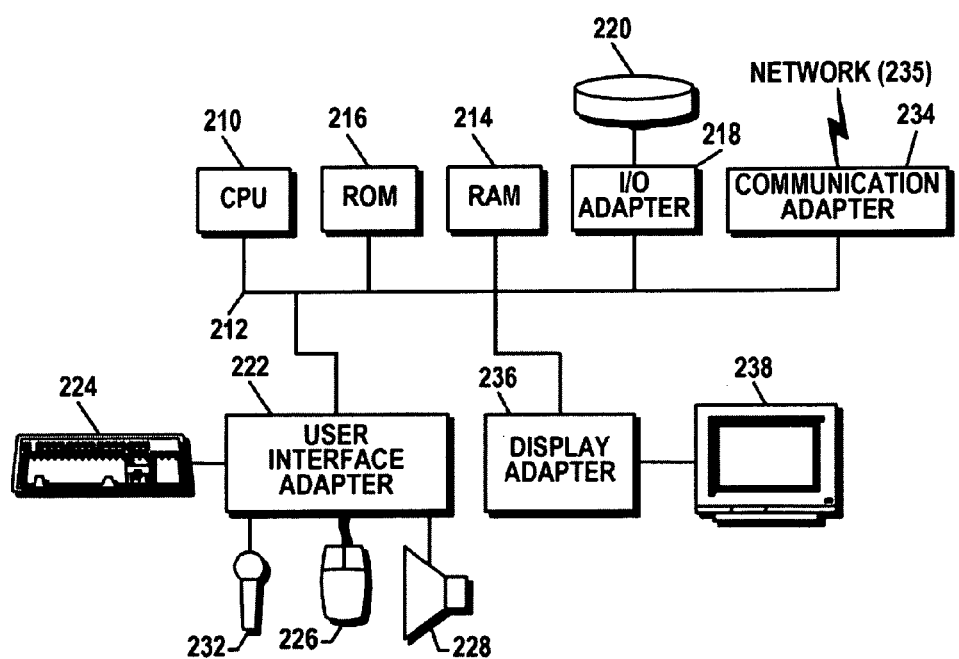
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
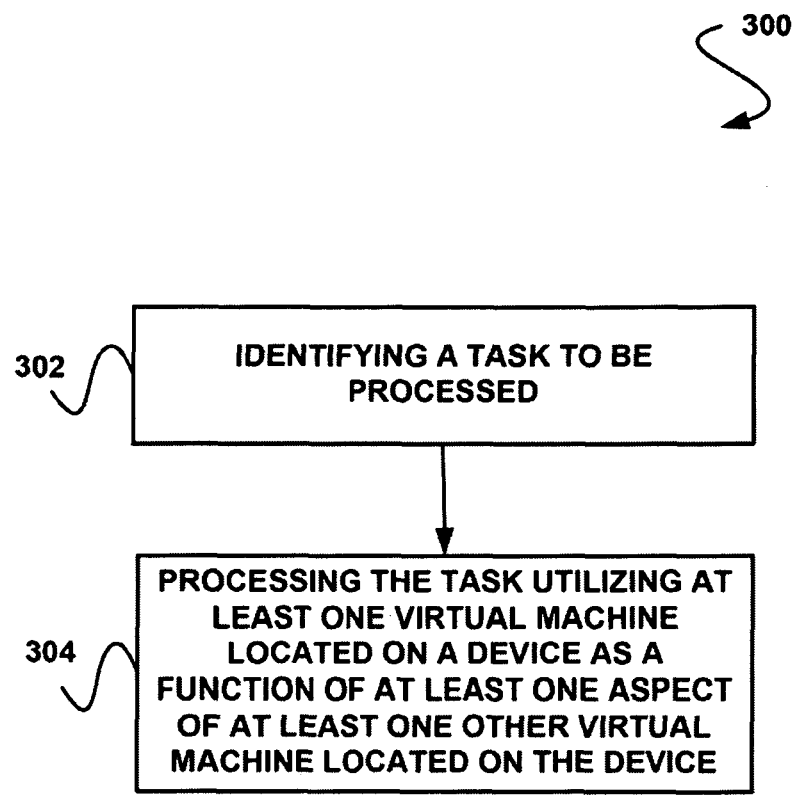
FIG. 3 shows a method for processing a task utilizing a virtual machine as a function of an aspect of another virtual machine, in accordance with one embodiment.

FIG. 3 shows a method 300 for processing a task utilizing a virtual machine as a function of an aspect of another virtual machine, in accordance with one embodiment. As an option, the method 300 may be carried out in the context of the architecture and environment of FIGS. 1 and/or 2. Of course, however, the method 300 may be carried out in any desired environment.

As shown in operation 302, a task to be processed is identified. With respect to the present description, the task may include any operation to be processed. Additionally, the task to be processed may include a task to be executed, performed, etc.

In one embodiment, the task may include at least one instruction to be processed. Just by way of example, the task may include scanning data for unwanted data. Such unwanted data may include malware, spyware, etc.

Optionally, the task may be identified based on a request for the task to be processed. The request may be issued by any application, code, etc. In one embodiment, the request may be issued by a virtual machine. In another embodiment, the request may be issued by an on-demand scanner of the virtual machine. The on-demand scanner may issue the request based on a schedule, an amount of resource consumption associated with a device on which the virtual machine is located, etc.

Further, as shown in operation 304, the task is processed utilizing at least one virtual machine located on a device as a function of at least one aspect of at least one other virtual machine located on the device. In the context of the present description, the device may include any type of device capable of including (e.g. executing, etc.) multiple virtual machines. For example, the device may include a physical computer, such as any of the devices described above with respect to FIGS. 1 and/or 2.

Also in the context of the present description, the virtual machine (and optionally the other virtual machine) may include any virtual implementation of a machine capable of being utilized to process the task. Just by way of example, the first virtual machine and/or the second virtual machine may each include a software implementation of a physical computer, etc. In various embodiments, the first virtual machine and/or the second virtual machine may each include a guest virtual machine (e.g. a virtual machine running its own operating system), a security virtual machine (e.g. a virtual machine utilized for monitoring security, a virtual machine utilized for monitoring parameters of other virtual machines, etc.), a uniquely configured virtual machine, a general purpose virtual machine and/or any other desired type of virtual machine.

In one embodiment, the virtual machine utilized to process the task may include the virtual machine via which the task is identified (in operation 302). For example, the virtual machine may identify the task to be processed and may accordingly process the task as a function of an aspect of the other virtual machine. As another example, the on-demand scanner of the virtual machine may identify the task to be processed and may accordingly process the task as a function of an aspect of the other virtual machine.

As noted above, processing the task may include executing the task, performing the task, etc. Optionally, the task may be processed using the virtual machine by performing an on-demand scan of data utilizing the on-demand scanner of the virtual machine. Of course, however, the task may be processed in any desired manner that is a function of an aspect of the other virtual machine.

In one embodiment, the aspect of the at least one other virtual machine may include a number of virtual machines located on the device. Accordingly, the number virtual machines located on the device located on the device may be counted. Such count may be based on a predetermined type of virtual machine, such as, for example, a number of virtual machines that include an on-demand scanner.

Further, the processing of the task may be a function of the number of virtual machines located on the device in any desired manner. As an option, the processing of the task may be limited by a percentage calculated according to the number of virtual machines located on the device. In one embodiment, the processing of the task may be limited by limiting activity (e.g. resource consumption, etc.) of the virtual machine utilized to process the task by the calculated percentage. Such calculated percentage may be increased for each additional virtual machine included in the count, but of course may be determined in any manner that is based on the number of virtual machines located on the device.

As an example, if the number of virtual machines reflects a number of virtual machines located on the device that each includes an on-demand scanner, the number of virtual machines may represent a number of on-demand scanners associated with virtual machines of the device. To this end, the processing of the task may accordingly be limited by a percentage calculated according to the number of on-demand scanners associated with virtual machines of the device.

As another option, the processing of the task may be performed in a round-robin manner utilizing the virtual machine and the other virtual machine, based on the number of virtual machines located on the device. For example, a predetermined amount of processing of the task performed by each virtual machine located on the device may be determined based on the number of virtual machines located on the device (e.g. by dividing an estimated time to complete the processing of the task by the number of virtual machines located on the device, etc.). The predetermined amount of processing may include an amount of time each virtual machine located on the device processes the tasks, an amount of the task (e.g. a number of instructions, etc.) each virtual machine processes, etc.

In another embodiment, the aspect of the at least one other virtual machine may include a load placed on the device by the virtual machines located on the device (e.g. the virtual machines including an on-demand scanner, etc.). Such load may optionally include an amount of resources of the device consumed by the virtual machines. For example, the resources may include a CPU, network bandwidth associated with the device, etc.

Moreover, the processing of the task as the function of the load placed on the device by the virtual machines may include adjusting a priority of the processing based on such load. The priority of the processing may include a predefined limit on the processing of the task performed utilizing the virtual machine. Just by way of example, the virtual machine may only be allowed to process the task intermittently (e.g. at predetermined intervals, in predetermined amounts, etc.), based on the predefined limit.

Such predefined limit may be utilized to maintain a load placed on the device at a predetermined level. For example, in one embodiment, the priority may be lowered if the load exceeds a predefined maximum threshold. Lowering the priority may decrease a limit on an amount of processing of the task performed by the virtual machine (e.g. by decreasing the predefined limit on the processing of the task, etc.), such that the load on the device may be lowered.

As another example, the priority may be raised if the load is lower than a predefined minimum threshold. Raising the priority may optionally increase a limit on an amount processing of the task performed by the virtual machine, such that the load on the device may be allowed to increase. In one embodiment, the priority may be raised by increasing the predefined limit on the processing of the task.

In one embodiment, the processing of the task may be performed by the virtual machine independently of the other virtual machines, based on the load placed on the device. Thus, the processing of the task independently by the virtual machine may optionally be paused, resumed, or throttled (e.g. adjusted) according to the load on the physical machine. For example, if the load exceeds the predefined maximum threshold, the processing of the task by the virtual machine may be paused (e.g. for a predetermined period of time) and/or an amount of such processing lowered. As another example, if the load is below the predefined minimum threshold, the processing of the task by the virtual machine may be resumed (e.g. resumed from the paused state described above, etc.) and/or an amount of such processing raised.

Accordingly, activity of the virtual machine associated with processing the task may be adjusted according to a load placed on the device by virtual machines located on the device. The adjustment may be configured for maintaining the load placed on the device within a predetermined range. As another option, gross adjustments may be made to the processing of the task by the virtual machine for affecting the load placed on the device, such as delaying the processing of the task for a predetermined period of time, until processing of another task by the other virtual machine located on the device is completed, etc.

In one exemplary embodiment, each of the virtual machines of the device (or a subset thereof) may be utilized to process a different task simultaneously. For example, one of the virtual machines may scan all file associated therewith, whereas another one of the virtual machines may only scan user data files associated with such other virtual machine. Thus, the different tasks may be processed independently by an associated virtual machine, while also be processed simultaneously across the virtual machines. As an option, for each virtual machine processing a different task, the processing may be performed as a function of an aspect of the other virtual machines. In this way, processing performed by each of the virtual machines may be adjusted, prioritized, etc. even when such processing is for different tasks.

Of course, in another exemplary embodiment, each of the virtual machines of the device may be utilized to process in parallel the same task. Accordingly, the same task may be processed independently by each of the virtual machines of the device (or optionally a subset thereof), while also be processed simultaneously across the virtual machines. Just by way of example, the virtual machines may simultaneously process user data files, each virtual machine processing user data file that are particular thereto (e.g. which may be different across the virtual machines). For each of the virtual machines processing the same task (e.g. on different data), the processing may be performed as a function of an aspect of the other virtual machines. To this end, processing performed by each of the virtual machines may be adjusted, prioritized, etc. when such processing is for the same task simultaneously performed by the virtual machines.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
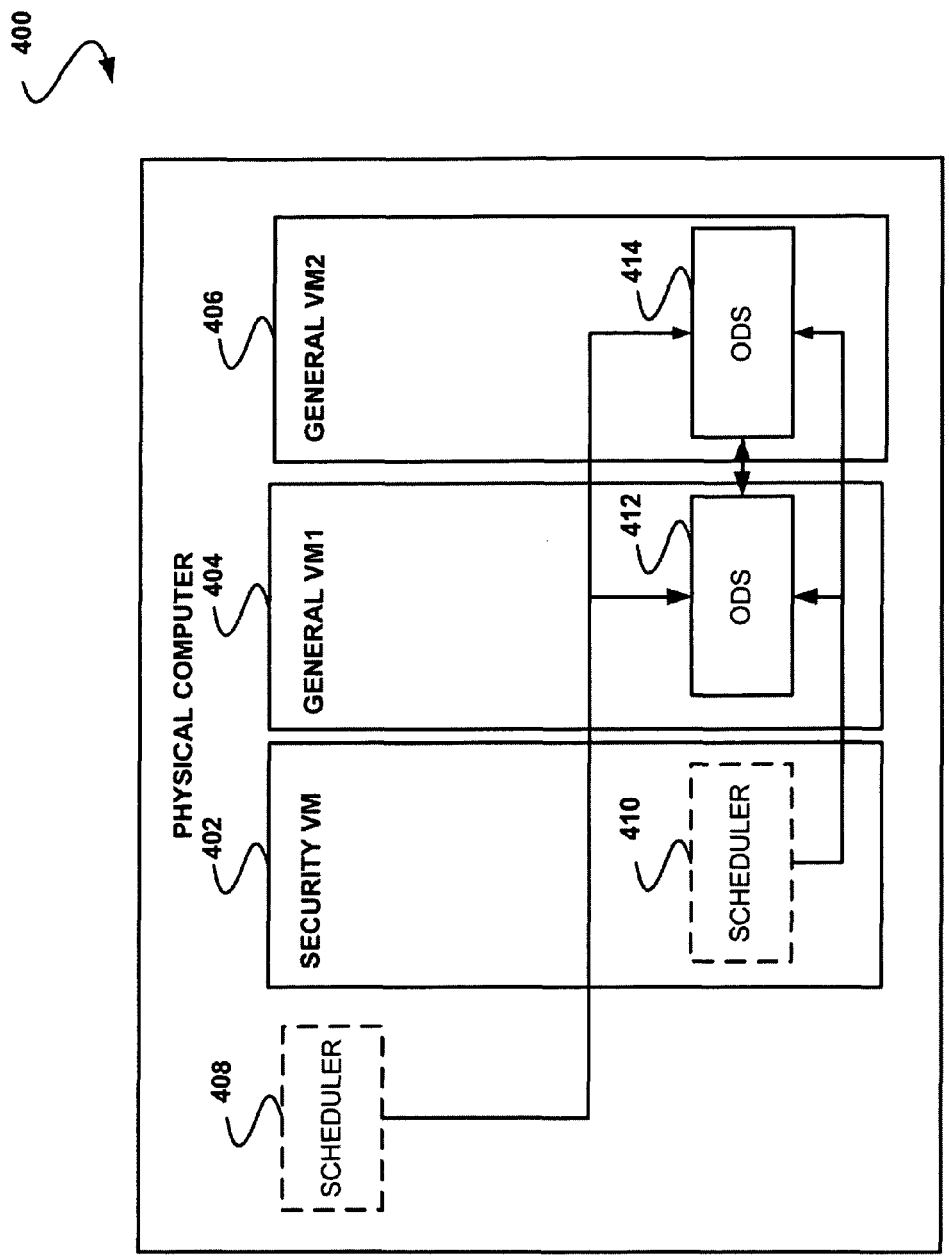
FIG. 4 shows a system for processing a task utilizing a virtual machine as a function of an aspect of another virtual machine, in accordance with another embodiment.

FIG. 4 shows a system 400 for processing a task utilizing a virtual machine as a function of an aspect of another virtual machine, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, in the context of the present embodiment, the system 400 may include a physical computer. For example, the system 400 may include a client and/or server computer. While a physical computer is described herein, it should be noted that the system 400 may include any device on which a plurality of virtual machines 402-406 may be located.

Additionally, the virtual machines 402-406 of the system 400 may include a security virtual machine 402 and multiple general virtual machines 404-406. Of course, however, the virtual machines 402-406 of the system 400 may include any desired type of virtual machines.

Further, a plurality of on-demand scanners 412-414 may be located on various virtual machines 402-406 of the system 400. As shown, the on-demand scanners 412-414 may be located on the general virtual machines 404-406, but of course may also be located on any other virtual machines 402-406 of the system 400. With respect to the present embodiment, the on-demand scanners 412-414 may each be utilized for scanning data in response to a request (e.g. generated manually by a user, generated automatically by an application, etc.) for such scan. It should also be noted that while the on-demand scanners 412-414 are shown, any desired type of scanner (e.g. on-access scanner, etc.) may be located on any of the virtual machines 402-406 of the system 400.

Still yet, the system 400 includes a scheduler 408-410. In one embodiment, the scheduler 408 may be located outside of the virtual machines 402-406 of the system 400. In another embodiment, the scheduler 410 may be located on the security virtual machine 402. Of course, however, the scheduler 408-410 may be located on any of the virtual machines 402-406 of the system 400.

To this end, a task to be processed may be identified by one of the virtual machines 402-406, in one embodiment. For example, the task to be processed may include scanning data utilizing an on-demand scanner 412-414 of a virtual machine 402-406, such that the task may be identified in response to a request for such scanning issued by the on-demand scanner 412-414. In another embodiment, the task to be processed may be identified by the scheduler 408-410 (e.g. by monitoring for the task, etc.).

Additionally, the task may be processed by the virtual machine 402-406 via which the task was identified (e.g. that issued the request for the task, etc.). With respect to the present embodiment, the task may be processed as a function of at least one aspect of at least one of the other virtual machines 402-406 of the system 400. As an option, the scheduler 408-410 may determine the manner in which the task is processed by the virtual machine 402-406.

In one embodiment, the scheduler 408-410 may determine an aspect of at least one of the other virtual machines 402-406 of the system 400, such that the task may be processed as a function of such aspect. In one embodiment, the scheduler 408 may be located outside of the virtual machines 402-406 of the system 400 (e.g. separate from such virtual machines 402-406), and may accordingly be capable of identifying the load on the system 400, activity of the virtual machines 402-406 of the system 400 (e.g. utilizing application program interfaces that allow discovery of the virtual machines 402-406, communication with the virtual machines 402-406, etc.), a number of virtual machines 402-406 of the system 400, and/or any other aspect of any of the virtual machines 402-406 of the system 400. In another embodiment, the scheduler 410 may be located on the security virtual machine 402, which may similarly be capable of identifying the load on the system 400, activity of the virtual machines 402-406 of the system 400, a number of virtual machines 402-406 of the system 400, and/or any other aspect of any of the virtual machines 402-406 of the system 400.

For example, the scheduler 408-410 may determine a number of the virtual machines 402-406 of the system 400 that include an on-demand scanner 412-414. Furthermore, the scheduler 408-410 may determine an amount of processing of the task to be performed by the virtual machine 402-406 (e.g. may calculate a percentage to which processing of the task by the virtual machine 402-406 is limited, etc.), whether the task is to be processed in a round-robin manner (and optionally an extent to which each virtual machine 402-406 of the system processes the task in the round-robin manner), etc. To this end, the scheduler 408-410 may instruct the virtual machine 402-406 via which the task was identified to process the task based on the amount of processing of the task to be performed by the virtual machine 402-406, for example.

As another example, the scheduler 408-410 may determine a load placed on the system 400 by the virtual machines 402-406 (or optionally by only the virtual machines 404-406 with on-demand scanners 412-414 located thereon). Additionally, the scheduler 408-410 may determine whether a priority of such virtual machine 402-406 (and optionally any of the other virtual machines 402-406) is to be adjusted based on the load. As another option, the scheduler 408-410 may determine whether the processing of the task is to be delayed, etc., based on the load. Thus, the scheduler 408-410 may instruct the virtual machine 402-406 via which the task was identified to process the task based on a priority determined by the scheduler 408-410, after a delay determined by the scheduler 408-410, etc.

To this end, the scheduler 408-410 may determine the processing of the task to be performed, and may further instruct the virtual machine 402-406 of the system 400 to process the task as a function of an aspect of another virtual machine 402-406 of the system 400. Thus, the virtual machines 402-406 may optionally cooperate with the scheduler 408-410 without necessarily being in direct communication with one another. As another option, the virtual machines 402-406 may be in communication with one another (e.g. for performing round-robin processing of the task, etc.). Of course, as another option, the scheduler 408-410 may control processing of the task by the virtual machine 402-406 as a function of an aspect of another virtual machine 402-406 of the system 400 without the knowledge of such virtual machine 402-406. Just by way of example, the scheduler 408-410 may suspend processing of the task by the virtual machine 402-406 by suspending a process, thread, etc. associated therewith.

Figure 5A:
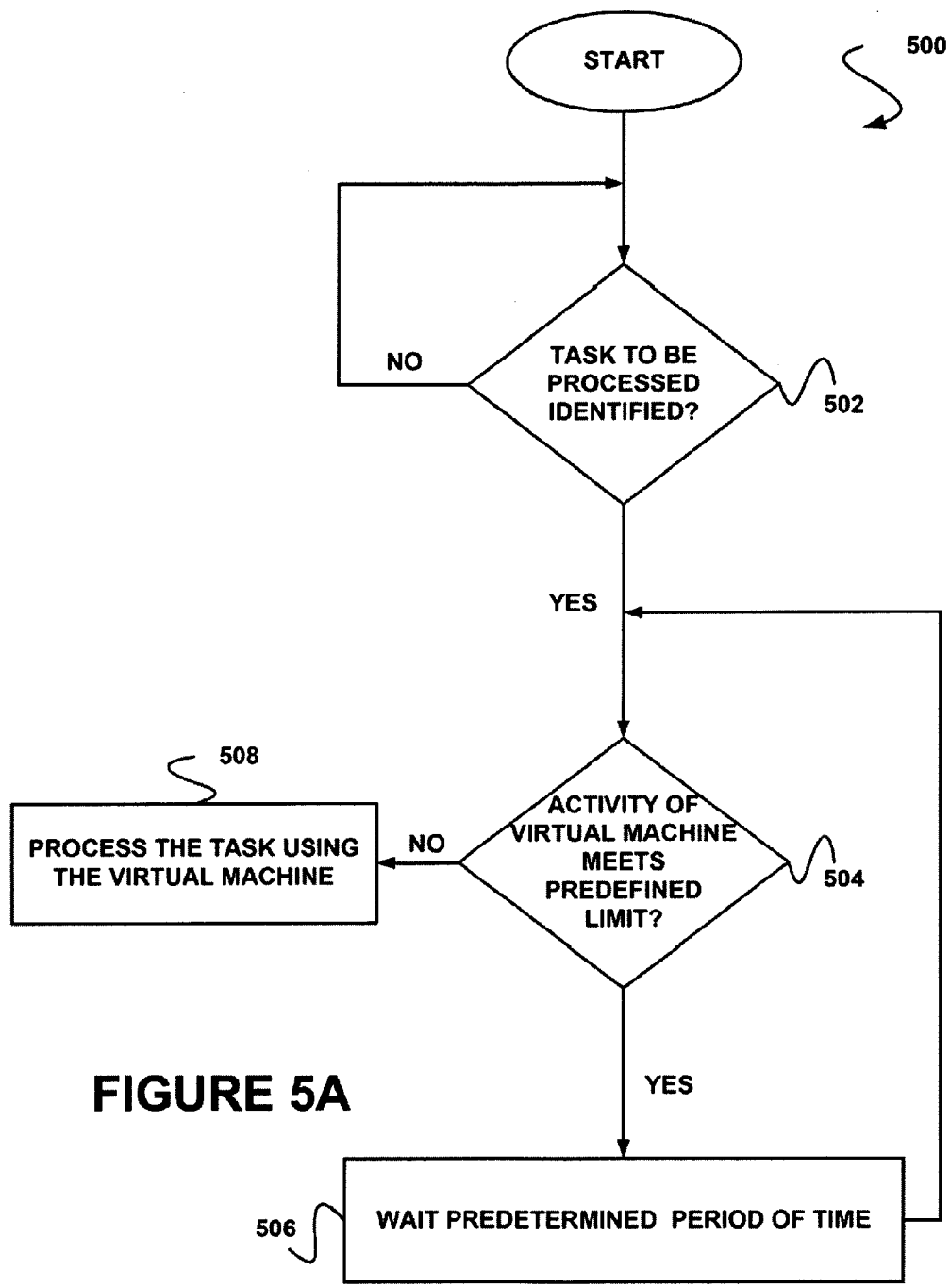
FIG. 5A shows a method for processing a task utilizing a virtual machine based on a predefined limit on activity associated with the virtual machine, in accordance with yet another embodiment.

FIG. 5A shows a method 500 for processing a task utilizing a virtual machine based on a predefined limit on activity associated with the virtual machine, in accordance with yet another embodiment. As an option, the method 500 may be carried out in the context of the architecture and environment of FIGS. 1-4. For example, the method 500 may be carried out utilizing the system 400 of FIG. 4. Of course, however, the method 500 may be carried out in any desired environment. Again, it should be noted that the aforementioned definitions may apply during the present description.

As shown in decision 502, it is determined whether a task to be processed is identified. In one embodiment, the task to be processed may be identified in response to a request for completion of such task. In another embodiment, the task to be processed may be identified based on a request for a processor to process the task.

If it is determined that a task to be processed is not identified, the method 500 continues to wait for such a task to be identified. If, however, it is determined that a task to be processed is identified, it is determined whether activity of a virtual machine meets a predefined limit. Note decision 504. With respect to the present embodiment, the virtual machine may include a virtual machine via which the task is to be processed.

Additionally, the activity of the virtual machine may include any processing performed by the virtual machine, resources consumed by the virtual machine (e.g. as a result of such processing, etc.). For example, the activity of the virtual machine may include scanning performed by the virtual machine. Such scanning may optionally be performed via an on-demand scanner of the virtual machine.

In one embodiment, the predefined limit may be determined by a scheduler of a system on which the virtual machine is located. For example, the scheduler may include either of the schedulers 408-410 of FIG. 4. In another embodiment, the predefined limit may be determined as a function of an aspect of at least one other virtual machine of the system on which the virtual machine is located. Just by way of example, the predefined limit may be determined as a function of a load placed on the system by the virtual devices of the system, as a function of a number of virtual machines located on the system, etc.

As an option, the predefined limit may indicate a percentage of processing capable of being performed by a processor the system (e.g. for processing the task). Of course, however, the predefined limit may also indicate any amount of a resource of the system allowed to be consumed by the virtual machine. As another option, the predefined limit may indicate an amount of time (e.g. within a predefined time period, etc.) during which the virtual machine is allowed to process the task.

To this end, determining whether the activity of the virtual machine meets the predefined limit may include comparing the activity of the virtual machine to the predefined limit. If it is determined that the activity of the virtual machine meets (e.g. matches or exceeds) the predefined limit, a predetermined period of time is allowed to elapse, as shown in operation 506. With respect to the present embodiment, the virtual machine may be prevented from processing the task during the predetermined period of time.

Furthermore, it is again determined whether the activity of the virtual machine meets the predefined limit (decision 504). In this way, the predetermined period of time may be allowed to elapse for reducing the activity of the virtual machine. In addition, the predetermined period of time may elapse any number of consecutive times until the activity of the virtual machine is below the predefined limit.

Once it is determined that the activity of the virtual machine does not meet the predefined limit, the task is processed using the virtual machine. Note operation 508. Processing the task may include performing the task, for example. Accordingly, activity of the virtual machine may be limited according to the predefined limit, by preventing processing of the task by the virtual machine when the activity of the virtual machine meets the predefined limit.

Figure 5B:
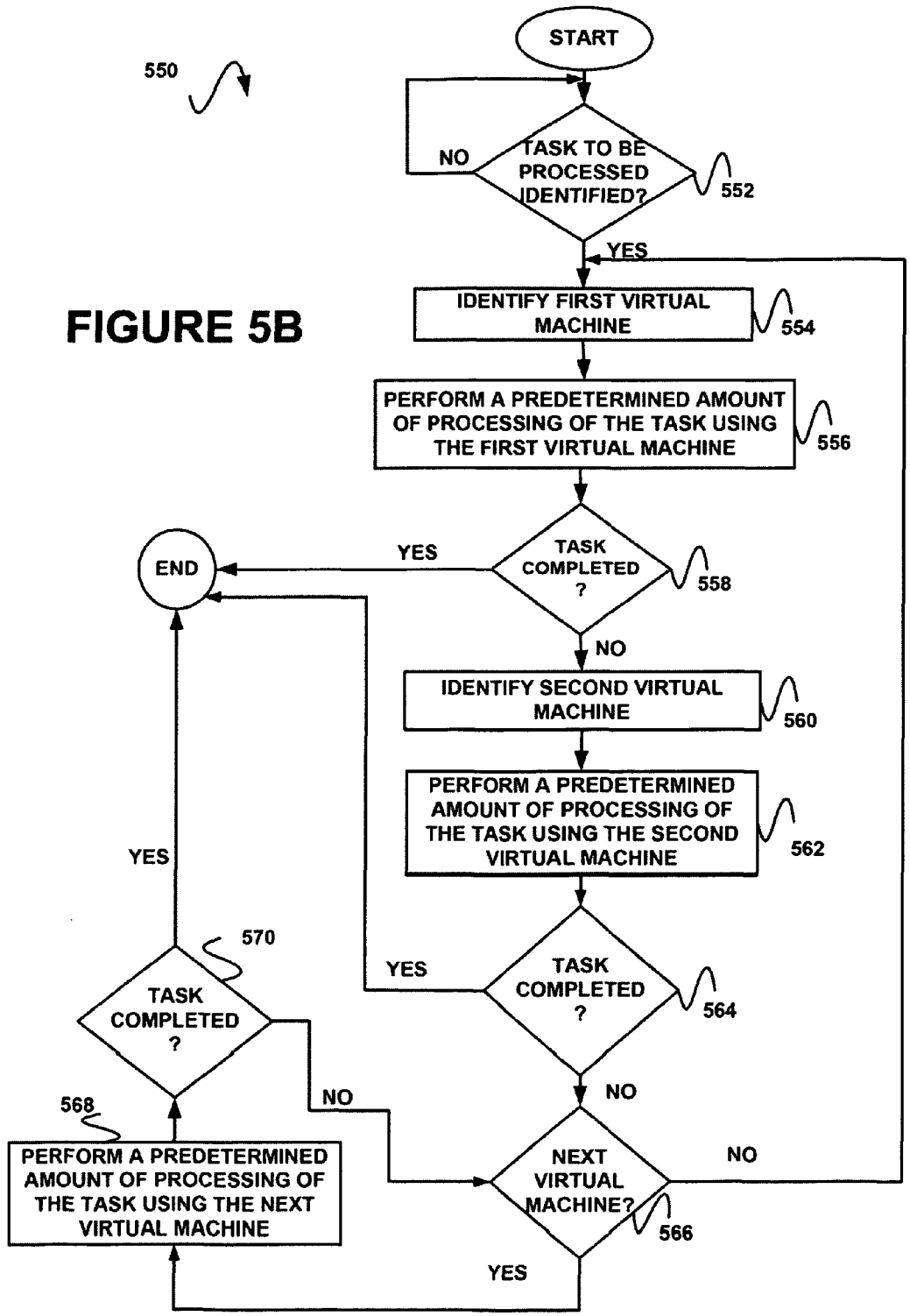
FIG. 5B shows a method for processing a task utilizing a plurality of virtual machines of a device in a round-robin manner, in accordance with still yet another embodiment.

FIG. 5B shows a method 550 for processing a task utilizing a plurality of virtual machines of a device in a round-robin manner, in accordance with still yet another embodiment. As an option, the method 550 may be carried out in the context of the architecture and environment of FIGS. 1-5A. For example, the method 550 may be carried out utilizing the system 400 of FIG. 4. Of course, however, the method 550 may be carried out in any desired environment. Yet again, it should be noted that the aforementioned definitions may apply during the present description.

As shown in operation 552, it is determined whether a task to be process is identified. In one embodiment, the task to be processed may be identified in response to a request for completion of such task. In another embodiment, the task to be processed may be identified based on a request for a processor to process the task.

If it is determined that a task to be processed is not identified, the method 500 continues to wait for such a task to be identified. If, however, it is determined that a task to be processed is identified, a first virtual machine is identified. Note operation 554. With respect to the present embodiment, the first virtual machine may include any virtual machine of a system that includes multiple virtual machines. For example, the first virtual machine may include a virtual machine via which the task to be processed was identified, a first virtual machine in a predetermined order of virtual machines, etc.

Additionally, a predetermined amount of processing of the task is performed using the first virtual machine, as shown in operation 556. In one embodiment, the predetermined amount of processing may be determined by a scheduler of a system on which the first virtual machine is located. For example, the scheduler may include either of the schedulers 408-410 of FIG. 4.

In another embodiment, the predetermined amount of processing may be determined as a function of an aspect of at least one other virtual machine of the system on which the first virtual machine is located. Just by way of example, the predetermined amount of processing may be determined as a function of a load placed on the system by the virtual devices of the system, as a function of a number of virtual machines located on the system, etc.

As an option, the predetermined amount of processing may indicate a percentage of processing allowed to be performed by the first virtual machine for processing the task. Of course, however, the predetermined amount of processing may also indicate any amount of a resource of the system allowed to be consumed by the virtual machine for processing the task. As another option, the predetermined amount of processing may indicate an amount of time during which the virtual machine is allowed to process the task.

Further, it is determined whether the task has completed, as shown in operation 558. Determining whether the task has completed may include determining whether any further processing of the task is to be performed. In one embodiment, the determination may include determining whether a process and/or thread associated with the task has terminated. Of course, however, it may be determined whether the task has completed in any desired manner.

If it is determined that the task has completed, the method 550 is terminated. If, however, it is determined that the task has not completed, a second virtual machine located on the system is identified. Note operation 560. The second virtual machine may include any virtual machine capable of processing the task (e.g. that includes an on-demand scanner, etc.) that is different from the first virtual machine. Just by way of example, the second virtual machine may include a virtual machine second in the predetermined order of virtual machines. It should be noted, however, that the second virtual machine may be identified in based on any desired criteria.

Still yet, as shown in operation 562, a predetermined amount of processing of the task is performed using the second virtual machine. In one embodiment, the predetermined amount of processing may be determined by the scheduler of the system (e.g. in the manner described above with respect to the first virtual machine). In another embodiment, the predetermined amount of processing may include the predetermined amount of processing allowed for the first virtual machine.

As shown in decision 564, it is determined whether the task has completed. If the task has completed, the method 550 is terminated. If, however, it is determined that the task has not completed, it is determined whether a next virtual machine of the system exists, as shown in decision 566. The next virtual machine may include any virtual machine of the system capable of processing the task that is different from previous virtual machines (e.g. the first and second virtual machines) that processed the task. In one embodiment, the next virtual machine may include a virtual machine next in the predetermined order of virtual machines.

If it is determined that a next virtual machine of the system exists, a predetermined amount of processing of the task is performed using the next virtual machine. Note operation 568. In one embodiment, the predetermined amount of processing may be determined by the scheduler of the system (e.g. in the manner described above with respect to the first virtual machine). In another embodiment, the predetermined amount of processing may include the predetermined amount of processing allowed for the first virtual machine and/or second virtual machine.

Moreover, it is determined whether the task has completed. If the task has completed, the method 570 is terminated. If, however, it is determined that the task has not completed, it is again determined whether yet a next virtual machine of the system exists (operation 566). Once it is determined that a next virtual machine of the system does not exist, the method 550 identifies the first virtual machine (operation 554), such that the first virtual machine may perform a predetermined amount of processing of the task (operation 556). In this way, processing of the task may be performed in a round-robin manner, utilizing the plurality of virtual machines of the system.

Figure 6:
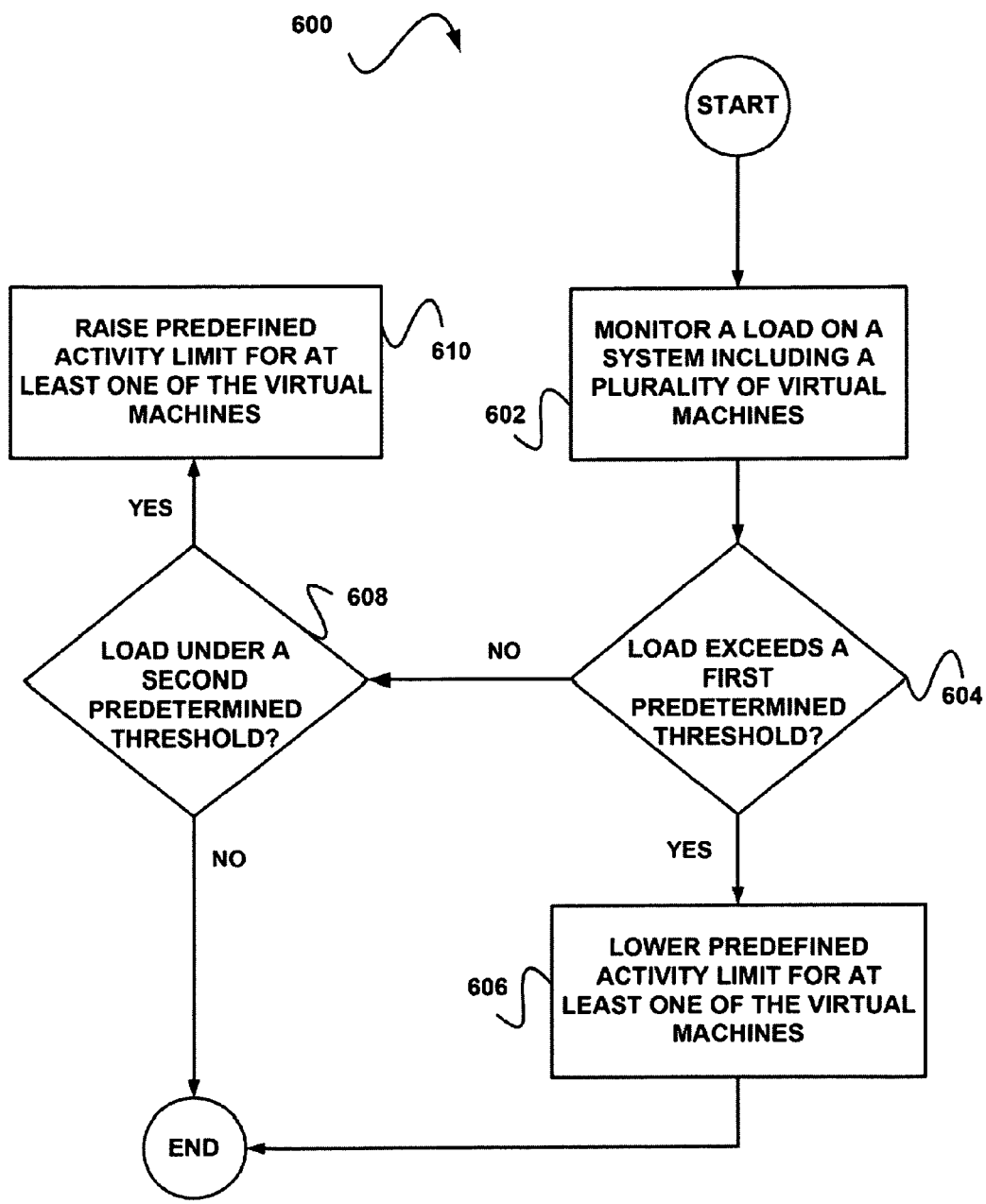
FIG. 6 shows a method for adjusting a predefined limit on activity associated with a virtual machine, in accordance with another embodiment.

FIG. 6 shows a method 600 for adjusting a predefined limit on activity associated with a virtual machine, in accordance with another embodiment. As an option, the method 600 may be carried out in the context of the architecture and environment of FIGS. 1-5B. For example, the method 600 may be carried out utilizing the scheduler 408-410 of FIG. 4. Of course, however, the method 600 may be carried out in any desired environment. Yet again, it should be noted that the aforementioned definitions may apply during the present description.

As shown in operation 602, a load on a system that includes a plurality of virtual machines is monitored. Monitoring the load may include monitoring activity of each of the virtual machines, in one embodiment. In another embodiment, monitoring the load may include monitoring an amount of consumption of at least one resource of the system.

Additionally, it is determined whether the load exceeds a first predetermined threshold, as shown in decision 604. The first predetermined threshold may include a predetermined maximum threshold, for example. As an option, the first predetermined threshold may be predefined manually and/or automatically (e.g. based on percentage of a capability of the system, etc.).

If it is determined that the load exceeds the first predetermined threshold, a predefined activity limit for at least one of the virtual machines of the system is lowered. Note operation 606. The predefined activity limit may include a limit on an amount of processing allowed to be performed by the virtual machine (e.g. within a predetermined period of time, etc.). Lowering the predefined activity limit may accordingly lower an amount of activity of the virtual machines, thus reducing a load on the system.

Further, the virtual machine(s) for which the predefined activity limit is lowered may be selected in any desired manner. In one embodiment, the predefined activity limit may be lowered for a virtual machine performing a greatest amount of processing. In another embodiment, the predefined activity limit may be lowered for a plurality of the virtual machines performing the greatest amount of processing.

Still yet, the predefined activity limit may be lowered by any desired amount. Just by way of example, the predefined activity limit may be lowered a predetermined amount. While not shown, it may again be determined (e.g. a predetermined amount of time after the lowering of the predefined activity limit) whether the load of the system exceeds the first predetermined threshold (operation 604). In this way, the predefined activity limit may be incrementally lowered until the load on the system is below the first predetermined threshold, as an option.

If it is determined that the load does not exceed the first predetermined threshold, it is determined whether the load is under a second predetermined threshold. Note operation 608. The second predetermined threshold may include a predetermined minimum threshold, for example. As an option, the second predetermined threshold may be predefined manually and/or automatically (e.g. based on percentage of a capability of the system, etc.).

If it is determined that the load is not under the second predetermined threshold, the method 600 terminates. For example, such determination may indicate that the load is within a range predetermined to be acceptable for the system. If, however, it is determined that the load is under the second predetermined threshold, the predetermined activity limit for at least one of the virtual machines is raised. Note operation 610. Raising the predefined activity limit may accordingly raise an amount of activity of the virtual machines, thus increasing a load on the system.

Further, the virtual machine(s) for which the predefined activity limit is raised may be selected in any desired manner. In one embodiment, the predefined activity limit may be raised for a virtual machine performing a least amount of processing. In another embodiment, the predefined activity limit may be raised for a plurality of the virtual machines performing the least amount of processing.

Still yet, the predefined activity limit may be raised by any desired amount. Just by way of example, the predefined activity limit may be raised a predetermined amount. While not shown, it may again be determined (e.g. a predetermined amount of time after the raising of the predefined activity limit) whether the load of the system is still under the second predetermined threshold (operation 608). In this way, the predefined activity limit may be incrementally raised until the load on the system is above the second predetermined threshold, as an option.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising executable instructions stored thereon to cause one or more processors to:
   identify a scanning task to be processed on a first virtual machine of a plurality of virtual machines;
   determine a subset of the plurality of virtual machines that have a scanner process;
   predetermine, prior to processing the scanning task, a first, second, and subsequent amount of processing based on a number of virtual machines determined to be in the subset, the first, second, and subsequent amount of processing to be executed respectively on a first, second, and subsequent virtual machine of the subset;
   determine a load on a system of the first virtual machine, wherein the load is compared to a first high threshold and a second low threshold;
   perform a first adjustment, prior to processing the scanning task, to the first, second, and subsequent amount of processing based on the comparison of the load on the system with the first high threshold and the second low threshold;
   perform a second adjustment, prior to processing the scanning task, to the first, second, and subsequent amount of processing based on an activity limit of each of the first, second, and subsequent virtual machine of the subset;
   process the first amount of the identified scanning task within the first virtual machine;
   process the second amount of the identified scanning task within the second virtual machine; and
   process subsequent predetermined amounts of the identified scanning task within subsequent virtual machines of the subset until processing of the identified scanning task has been completed.

2. The non-transitory computer readable medium of claim 1, wherein the instructions to cause one or more processors to identify a scanning task to be processed comprise instructions to cause one or more processors to identify a request for the scanning task to be processed.

3. The non-transitory computer readable medium of claim 2, wherein the request is issued by the first virtual machine.

4. The non-transitory computer readable medium of claim 3, wherein the request is issued by an on demand scanner of the first virtual machine.

5. The non-transitory computer readable medium of claim 1, wherein a scheduler determines each predetermined amount of the identified scanning task to be processed on each of the subset of virtual machines.

6. The non-transitory computer readable medium of claim 5, wherein the scheduler is located on at least one virtual machine of the plurality of virtual machines.

7. A method, comprising:
   identifying a scanning task to be processed on a first virtual machine of a plurality of virtual machines on a device;
   determining a subset of the plurality of virtual machines that have a scanner processing;
   predetermining, prior to processing the scanning task, a first and subsequent amount of processing based on a number of virtual machines determined to be in the subset, the first and subsequent amount of processing to be executed respectively on a first and subsequent virtual machine of the subset;
   determining a load on a system of the first virtual machine, wherein the load is compared to a first high threshold and a second low threshold;
   performing a first adjustment, prior to processing the scanning task, to the first and subsequent amount of processing based on the comparison of the load on the system with the first high threshold and the second low threshold;
   performing a second adjustment, prior to processing the scanning task, to the first and subsequent amount of processing based on an activity limit of each of the first and subsequent virtual machines of the subset;
   processing the first amount of the identified scanning task within the first virtual machine; and
   processing the subsequent amounts of the identified scanning task by a sequence of other virtual machines of the subset until processing of the identified scanning task has been completed.

8. The method of claim 7, where the sequence of other virtual machines is determined prior to processing the first predetermined amount of the identified scanning task.

9. The method of claim 7, wherein a scheduler determines each predetermined amount of the identified scanning task to be processed on each of the subset of virtual machines.

10. The method of claim 7, wherein the first, second, and subsequent amount of processing are limited by a percentage calculated according to the number of virtual machines on the device.

11. The method of claim 7, wherein identifying the scanning task to be processed comprises identifying a request for the scanning task to be processed.

12. The method of claim 11, wherein the request is issued by the first virtual machine.

13. A system with a plurality of virtual machines, comprising:
- a memory; and
- a processor coupled to the memory, the processor adapted to execute instructions stored in the memory to:
  - receive a scanning task to be processed;
  - determine a subset of a plurality of virtual machines that have a scanner process;
  - order the subset of the plurality of virtual machines, wherein a first, second, and subsequent virtual machines of the subset are identified to process the scanning task;
  - predetermine, prior to processing the scanning task, a first, second, and subsequent amount of processing based on a number of virtual machines determined to be in the subset, the first, second, and subsequent amount of processing to be executed respectively on a first, second, and subsequent virtual machine of the subset;
  - determine a load on the system, wherein the load is compared to a first high threshold and a second low threshold;
  - perform a first adjustment, prior to processing the scanning task, to the first, second, and subsequent amount of processing based on the comparison of the load on the system with the first high threshold and the second low threshold;
  - perform a second adjustment, prior to processing the scanning task, to the first, second, and subsequent amount of processing based on an activity limit of each of the first, second, and subsequent virtual machines of the subset;
  - process the first amount of the scanning task within the first virtual machine;
  - process the second amount of the scanning task within the second virtual machine; and
  - process the subsequent amounts of the scanning task by subsequent virtual machines of the subset plurality of virtual until processing of the scanning task has been completed.

14. The system of claim 13, further comprising a scheduler which orders the plurality of virtual machines and determines each predetermined amount of the scanning task to be processed on each of the subset of virtual machines.

15. The system of claim 14, wherein the scheduler is located on at least one virtual machine of the plurality of virtual machines.

16. The system of claim 13, wherein the first, second, and subsequent amount of processing are limited by a percentage calculated according to the number of virtual machines on the system.

* * * * *

UNITED STATES PATENT AND TRADEMARK OFFICE
CERTIFICATE OF CORRECTION

| | | |
|---|---|---|
| PATENT NO. | : 8,516,478 B1 | Page 1 of 1 |
| APPLICATION NO. | : 12/138104 | |
| DATED | : August 20, 2013 | |
| INVENTOR(S) | : Jonathan L. Edwards et al. | |

It is certified that error appears in the above-identified patent and that said Letters Patent is hereby corrected as shown below:

On the Title Page, Item (54), and in the Specification, column 1, line 5, Title, delete "SUBSEQUEST" and insert -- SUBSEQUENT --, therefor.

In the Claims

In column 12, line 37, in claim 7, delete "processing;" and insert -- process; --, therefor.

In column 14, line 17-18, in claim 13, after "subset" delete "plurality of virtual".

Signed and Sealed this
Fifth Day of November, 2013

Teresa Stanek Rea
*Deputy Director of the United States Patent and Trademark Office*